INVENTORS
ERIK WENNERBO &
GOSTA HEDBERG
By Young, Emery & Thompson
ATTYS.

INVENTORS
ERIK WENNERBO &
GOSTA HEDBERG
By Young, Emery & Thompson
ATTYS.

April 28, 1959 E. WENNERBO ET AL 2,884,255

ADAPTER FOR PHONOGRAPH SPINDLES

Filed Oct. 11, 1954 4 Sheets-Sheet 3

INVENTORS

ERIK WENNERBO
GOSTA HEDBERG

BY Irvin S. Thompson
ATTY.

ADAPTER FOR PHONOGRAPH SPINDLES

Filed Oct. 11, 1954

4 Sheets-Sheet 4

INVENTORS
ERIK WENNERBO
GOSTA HEDBERG
BY Irwin S. Thompson
ATTY.

United States Patent Office 2,884,255

Patented Apr. 28, 1959

2,884,255

ADAPTER FOR PHONOGRAPH SPINDLES

Erik Wennerbo and Gösta Hedberg, Motala, Sweden, assignors to Industriaktiebolaget Luxor, Motala, Sweden, a corporation of Sweden Application October 11, 1954, Serial No. 461,602

Claims priority, application Sweden October 19, 1953

2 Claims. (Cl. 274—10)

The present invention relates to an auxiliary device to enable playing of records with large center holes on phonographs provided with a center spindle for records with the customary center hole, which center spindle includes means for releasing one in turn of unplayed records stacked on said spindle, the auxiliary device being formed as a center spindle with correspondingly large outer diameter, which spindle is attachable to and detachable from said ordinary spindle.

The heretofore standard records are supplied with a center hole, which has a diameter of about 7 mm. and those record changers, on which these records are to be played, have accordingly been provided with a center spindle, the diameter of which is somewhat smaller than the center hole of these records, so that the records after having been fed on to the turntable may be well centered by the spindle.

However, except these customary records with standard center holes there are also records with oversize center holes. In order to enable the record changers to be used also for these records they generally are provided with two different center spindles, one with small and one with large diameter, which each contains a complete record releasing mechanism and which are interchangeable.

The auxiliary center spindle, which accordingly is necessary, will thus be rather expensive.

It is an object of the present invention to simplify and make cheaper the said auxiliary device, which is characterized by the act that the large center spindle is arranged in such a manner, that when in use for releasing records with large center holes the releasing means of the small center spindle during at least a part of the changing cycle directly engage the records stacked on the large center spindle.

The invention will hereinafter be described with reference to the accompanying drawings, wherein.

Figure 4:
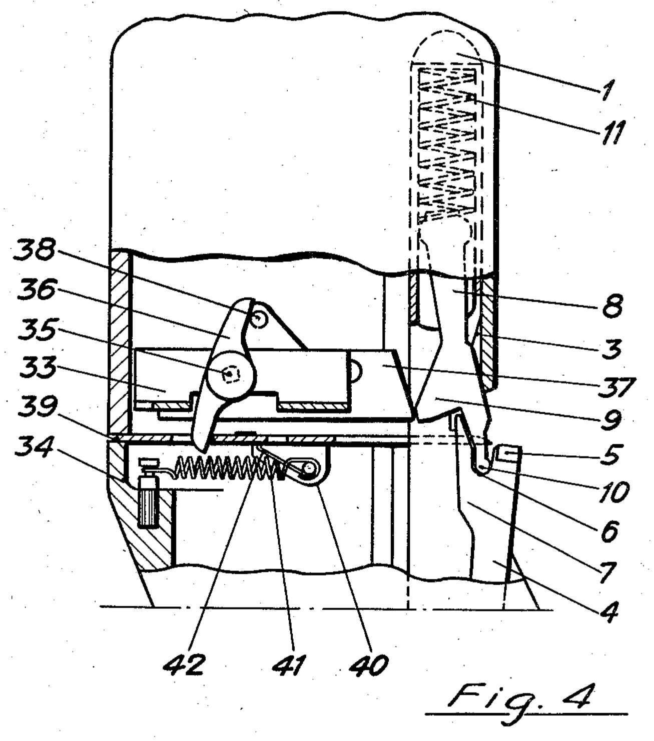
Figure 4 shows a side view, partly in section, of another embodiment of the invention.
Figure 5:
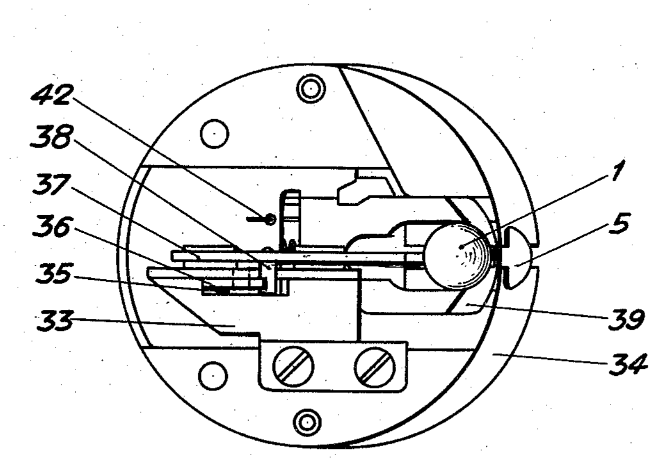
Figure 5 is a plan view with parts removed.
Figure 6:
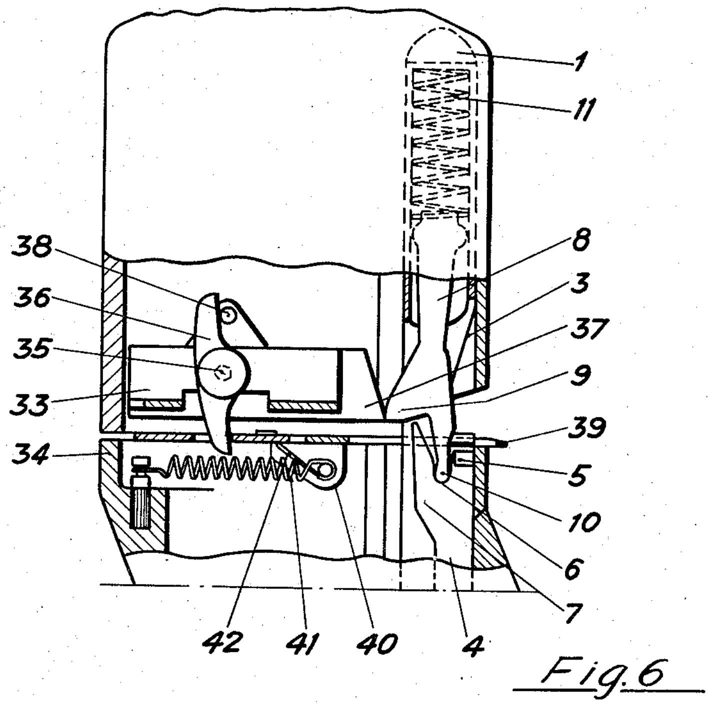
Figure 7:
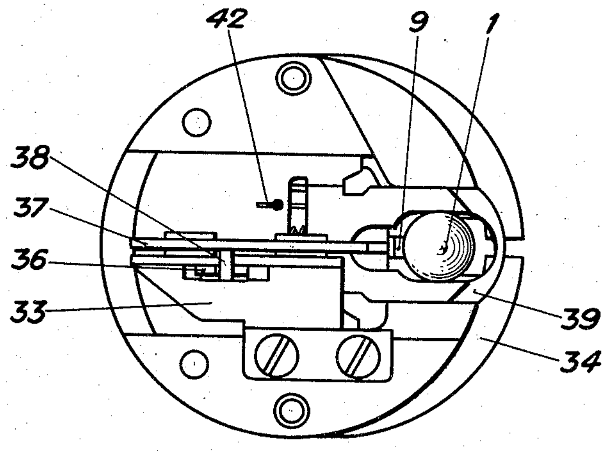

Figures 6 and 7 correspond to Figures 4 and 5, showing the parts in another position.

Figure 1:
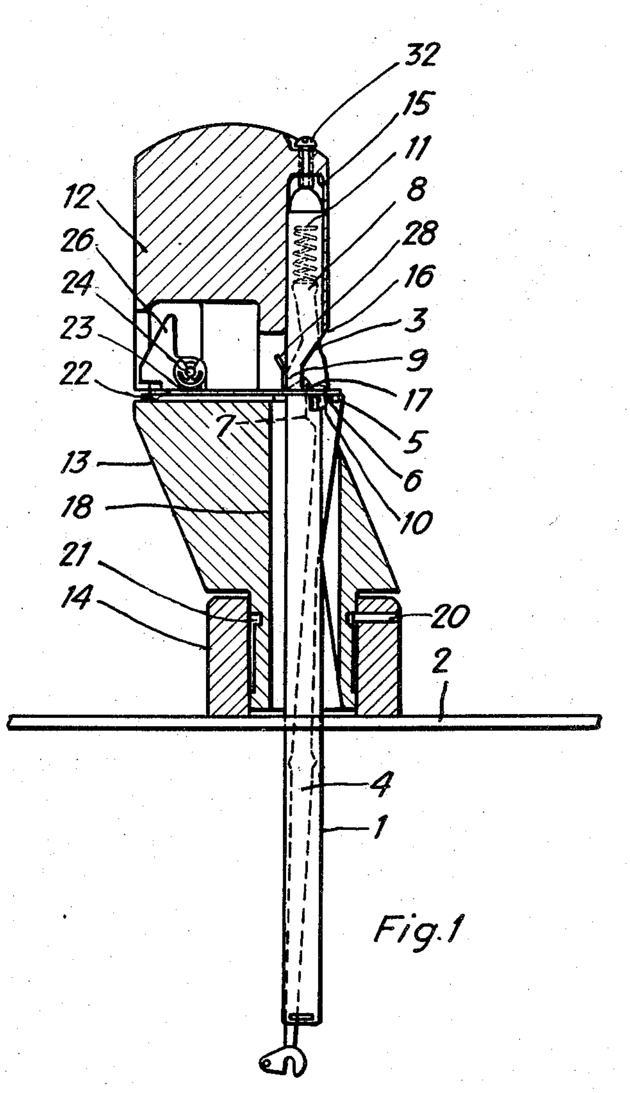
Figure 1 is in section a side view of a device according to the invention.

In the drawings 1 designates a center spindle, which extends through a turntable 2. In the center spindle a recess is made, the lower portion of which is plane and perpendicular to the longitudinal direction of the center spindle, thereby forming a shelf (hidden in Figure 1), which is adapted to temporarily support a stack of records with standard center holes. In the center spindle from the recess 3 and downwards there is cut a groove, in which a rod 4 is rockably mounted. At its upper end the rod 4 terminates in a plane supporting shoulder 5, a recess 6 and a projection 7 extending to the left.

Above the recess 3 the center spindle is provided with a bore, in which an arm 8 is rockably mounted. At its lower end the arm 8 is provided with a projection 9 and a downwardly extending pin 10. In said bore a coil spring 11 is also inserted, which urges the arm 8 downwardly, the pin 10 of said arm normally engaging the recess 6 of the rod 4.

The device now described is the ordinary center spindle of the record changer, said spindle being intended for releasing records with small center holes. This center spindle is particularly described in the U.S. patent specification No. 2,621,048.

The auxiliary device according to the present invention constitutes a larger center spindle, which is attachable directly to the ordinary one. This larger spindle consists of three interconnected parts, one upper part 12, one intermediary part 13 and one lower part 14.

The upper part 12 is excentrically arranged in relation to the spindle 1, this being inserted in a bore 15 made in the length direction of and near to the outer edge of said part. In the lower end of the part 12 a recess 16 and a shelf 17 are made, the former one facing the recess 3 of the ordinary spindle. The recess 16 corresponds to the recess 3 and the shelf 17 corresponds to the shelf of the ordinary spindle for temporarily supporting a stack of records. At a lower end of the part 12 transversal recesses for the record releasing means are made, which means are arranged in the intermediary part 13 and will be described below.

The upper end of the intermediary part 13 is concentric with the upper part 12 and its lower end is concentric with the ordinary spindle 1. Said spindle extends through the intermediary part 13 in a bore 18. The lower end of the part 13 is reduced and around this end the lower part 14 is rotatably mounted. This part 14 is along its whole length concentric with the spindle 1 and is supported and rotated by the turntable, whereas the parts 12 and 13 as well as the spindle 1 is unrotatably arranged.

Figure 2:
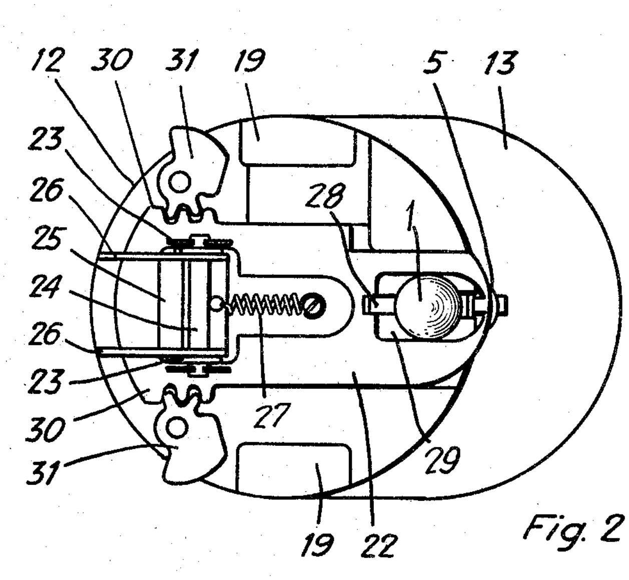
Figure 2 is a top view of the same device with an upper part removed.
Figure 3:
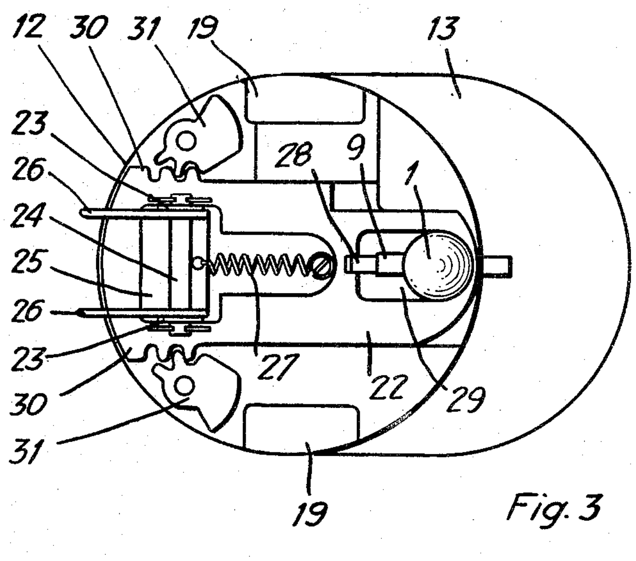
Figure 3 is the same view as in Figure 2 but with the details in another working position.

The upper part 12 has two pegs which engage recesses 19 made in the intermediary part 13 (see Figs. 2 and 3). By means of screws extending through these pegs the two parts are connected together. A pin 20 is inserted in the lower part 14 and protrudes into a groove 21 made in the part 13, by means of which the part 14 sticks to the other parts when the adapter spindle is removed from the ordinary spindle.

In the intermediary part 13 a slide 22 is displaceably arranged. From this slide two ears 23 project, through which a shaft 24 extends. Around the shaft 24 a U-shaped clamp is rotatably mounted, the two upwardly projecting legs of which are formed as displacing members 26. By means of a spring 27 these members and the slide 22 are brought to the position shown in Fig. 1 and Fig. 2. In this position a projection 28 of the slide is in engagement with the projection 9 of the arm 8. The ordinary spindle passes the slide 22 in a recess 29.

The slide 22 is on both sides of its left end provided with teeth 30 engaging teeth of two wings 31, pivotally mounted on the upper end of the intermediary part 13.

To enable the adjusting of the adapter spindle in relation to the ordinary spindle, the former is in its upper part 12 supplied with an adjusting screw 32, which rests upon the upper end of the ordinary spindle.

The device now described operates in the following manner, the function of the ordinary spindle being fully described in the U.S. patent specification No. 2,621,048 mentioned above.

When records with large center holes are to be played, the adapter spindle is slipped on the ordinary spindle after which the records are stacked on the adapter. The records then rest on the right end of the slide 22 projecting outside the periphery of the upper part 22 and further on the wings 31 (Fig. 2).

At the change of records the record changing mechanism turns the rod 4 in counter-clockwise direction, the arm 8 thereby through cooperation between its pin 10 and the recess 6 of the rod 4 being turned in clockwise direction, so that its projection 9 displaces the slide 22 to the left against the action of the spring 27. The various elements thereby assume the position according to Fig. 3. The right end of the slide 22 as well as the supporting shoulder 5 then is situated within the periphery of the upper part 12 and it is the same case of the wings 31, which have by means of the teeth engagement with the slide 22 been turned to the position according to Fig. 3. The lowermost record hereby loses its support and falls along the parts 13 and 14 down on to the turntable. On the other hand the displacing members 26, now being outside the periphery of the upper part 12, have laterally displaced at least the lowermost record but one on to the supporting shelf 17, while this record and the records above the same are kept from accompanying the lowermost record when falling down on to the turntable.

After that the record changing mechanism rocks the rod 4 in a clockwise direction, the various elements thereby being returned to the position according to Fig. 2. The arm 8 will then laterally displace the rest of the records in the stack on to the wings 31 and the right end of the slide 22, after which the same function may be repeated.

When the records brought down on to the turntable in the above described manner are to be removed from the turntable this is effected by lifting the records along the adapter spindle. The records will then press the portion of the rod 4 projecting outside the adapter spindle inwards within the periphery of the part 13, which means that the various elements temporarily will assume the position according to Fig. 3, in which only the displacing members 26 are in the path of the records. These members, however, are as is previously mentioned pivotally mounted around the shaft 24, why the records against the action of the spring 27 will turn them inside of the periphery of the upper part.

It is thus enabled to remove the records from the turntable without first removing the adapter spindle.

According to the second embodiment a support 33 is fixed in the intermediate part 34 of the adapter. The support 33 is provided with a pin 35, round which is rotatably arranged a switch 36. In the support is further arranged a slide 37 for engagement with the projection 9 of the arm 8, which slide is displaceable in a direction transverse of the adapter. A pin 38 is fixed to the slide 37 for engagement with the upper part of the switch 36, the lower part of which is in engagement with a knife-shaped member 39. This is provided with a downwardly projecting ear 40, which is fixed to one end of a spring 41, the other end of which is fixed to the intermediate part of the adapter. The knife-shaped member 39 is also slidably arranged in the adapter in a transverse direction. By the spring 41 the knife-shaped member 39 is drawn to the left, this turning the switch 36 in a clockwise direction and through the pin 38 forcing the slide 37 to the right into engagement with the projection 9 of the arm 8.

When records with large center holes are stacked on this adapter they rest directly on the supporting shoulder 5 of the ordinary spindle protruding through a transverse opening made in the adapter. This position is shown in Figures 4 and 5. As the records both when using and not using the adapter are one-sidedly supported by the shoulder 5 it is necessary to use a record-steadying arm, which stabilizes the records through engagement with the upper side of the stack.

At the record changing operation the rod 4 and arm 8 as previously mentioned, are rocked to the left; thus the latter presses the slide 33 to the left by its projection 9. By means of the pin 38 the switch 36 is then turned counterclockwise displacing the knife-shaped member 39 to the right outside the envelope surface of the adapter and inserting it between the lowermost record and the lowermost record but one in the stack. The rest of the records is now supported by the member 39 while the shoulder 5 is inside said envelope surface, thereby releasing the lowermost record to let it fall down onto the turntable. This position of the device is disclosed in Figures 6 and 7. The various elements will then return to the position shown in Figures 4 and 5.

The right part of the knife-shaped member 39 is rotatably arranged in relation to the left part of it, so that it can be swung upwardly for permitting the removal of the played records from the turntable. A spring 42 keeps the right part of said member in its ordinary place.

According to this last mentioned embodiment the knife-shaped member together with the body of the adapter are the only main elements necessary to enable the playing of records with large center holes on a customary record changer.

What we claim is:

1. For use with a phonograph having a rotatable turntable, and a spindle of relatively small diameter including means for supporting a stack of unplayed records when threaded onto said spindle, these records having center holes of correspondingly small diameter and releasing means to separate the undermost record from the other ones in said stack and to feed it on to the turntable, an adapter for receiving and centering a stack of records having large diameter center holes, said adapter having an axially directed opening for receiving the spindle, said opening extending near to the outer periphery of said adapter in the place thereof where said supporting means and said releasing means are located with the adapter attached to the spindle, said adapter being at the same place provided with a transverse opening through which said supporting means of the spindle protrudes outside the envelope surface of the adapter.

2. For use with a phonograph having a rotatable turntable, and a spindle of relatively small diameter including means for supporting a stack of unplayed records when threaded onto said spindle, these records having center holes of correspondingly small diameter and releasing means to separate the undermost record from the other ones in said stack and to feed it on to the turntable, an adapter for receiving and centering a stack of records having large diameter center holes, said adapter consisting of three parts, an upper and an intermediate and a lower part, interconnected to each other and provided with axially directed openings for receiving the spindle, said upper part being eccentrically arranged in relation to the spindle with said opening for the spindle being located near to the outer periphery of the upper part whereas the intermediate part at its upper end is coaxial with the upper part and from there on slopes downwards being at its lower end coaxial with the spindle and with the lower part, said upper part being provided with a transverse opening through which the adapter is attached to the spindle, and said supporting means of the spindle protruding outside the envelope surface of the adapter.

References Cited in the file of this patent

UNITED STATES PATENTS 2,666,648 Dale ................ Jan. 19, 1954

FOREIGN PATENTS 698,580 Great Britain .......... Oct. 21, 1953